US 9,341,272 B2

(12) United States Patent
Hoang

(10) Patent No.: US 9,341,272 B2
(45) Date of Patent: May 17, 2016

(54) GATE-COATING PROCESS

(75) Inventor: Loc Hoang, Houston, TX (US)

(73) Assignee: Cameron International Corporation, Houston, TX (US)

( * ) Notice: Subject to any disclaimer, the term of this patent is extended or adjusted under 35 U.S.C. 154(b) by 1581 days.

(21) Appl. No.: 12/602,610

(22) PCT Filed: Apr. 23, 2008

(86) PCT No.: PCT/US2008/061326
§ 371 (c)(1),
(2), (4) Date: Dec. 1, 2009

(87) PCT Pub. No.: WO2008/154075
PCT Pub. Date: Dec. 18, 2008

(65) Prior Publication Data
US 2010/0176327 A1  Jul. 15, 2010

Related U.S. Application Data

(60) Provisional application No. 60/943,246, filed on Jun. 11, 2007.

(51) Int. Cl.
F16K 3/00    (2006.01)
F16K 43/00   (2006.01)
F16K 51/00   (2006.01)
F16K 1/00    (2006.01)
F16L 55/18   (2006.01)
B05C 11/00   (2006.01)
B05D 1/32    (2006.01)
C23C 4/10    (2006.01)
C23C 4/08    (2006.01)
F16K 3/02    (2006.01)
C23C 4/00    (2016.01)

(52) U.S. Cl.
CPC ............. *F16K 3/0263* (2013.01); *C23C 4/005* (2013.01); *C23C 4/10* (2013.01); *Y10T 29/49281* (2015.01); *Y10T 29/49982* (2015.01)

(58) Field of Classification Search
CPC ............ F16K 3/0263; Y10T 29/49281; Y10T 29/49982; C23C 4/005; C23C 4/10
USPC ............... 251/326, 327, 328, 329; 137/15.18, 137/15.23, 315.11, 315.29, 315.3; 118/664, 118/665, 688, 708, 712; 427/448–449, 427/453–456
See application file for complete search history.

(56) References Cited

U.S. PATENT DOCUMENTS 3,172,193 A * 3/1965 Grove .................... 29/890.128
3,871,616 A * 3/1975 Taylor ......................... 251/175

(Continued)

FOREIGN PATENT DOCUMENTS

JP         01176862         7/1989

OTHER PUBLICATIONS

PCT International Search Report and Written Opinion for PCT/US2008/061326, dated Sep. 15, 2008.

*Primary Examiner* — John K Fristoe, Jr.
*Assistant Examiner* — Hailey K Do
(74) *Attorney, Agent, or Firm* — Fletcher Yoder, P.C.

(57) ABSTRACT

An apparatus that includes a body of a gate configured to seal a gate valve. In certain embodiments, the body has a first face with a first coating disposed thereon, and a second face opposite the first face and having a second coating disposed thereon. The body also may include a flow bore that extends from the first face, through the body of the gate, to the second face and a reference structure that does not have either the first coating or the second coating disposed thereon. In some embodiments, the reference structure is configured to define a plane on the first face, the second face, or both during a planarization process.

18 Claims, 6 Drawing Sheets

(56) References Cited

U.S. PATENT DOCUMENTS

| | | | |
|---|---|---|---|
| 4,032,672 A * | 6/1977 | McCormick | 427/450 |
| 5,762,089 A | 6/1998 | Haeberle et al. | |
| 5,829,735 A * | 11/1998 | Ikeda | 251/368 |
| 6,454,015 B1 | 9/2002 | Armstrong et al. | |
| 7,000,899 B2 | 2/2006 | Kammerer et al. | |
| 7,255,328 B2 * | 8/2007 | Hunter | 251/326 |
| 2005/0156131 A1 * | 7/2005 | Holliday | 251/326 |
| 2005/0167630 A1 * | 8/2005 | Kammerer et al. | 251/328 |

\* cited by examiner

GATE-COATING PROCESS

CROSS-REFERENCE TO RELATED APPLICATIONS

This application claims priority to PCT Application No. PCT/US2008/061326 entitled "Gate-Coating Process", filed on Apr. 23, 2008, which is herein incorporated by reference in its entirety, and which claims priority to U.S. Provisional Patent Application No. 60/943,246, entitled "Gate-Coating Process", filed on Jun. 11, 2007, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a variety of fluid handing systems, the flow of a fluid through a pipe is controlled by a gate valve. These valves typically include a moveable gate, static seat rings that seal against the gate, and a housing in which the gate and seat rings are disposed. Generally, the gate includes two-opposing faces that each contact a seat ring and a flow bore that extends between the faces. To conduct flow through the valve, the flow bore is slid into alignment with the seat rings, and to restrict the flow, it is slid out of alignment with the seat rings. As the gate moves from the sealed position to the unsealed position, it slides along a generally straight line between the seat rings, which are typically affixed to the housing.

In some applications, including applications in which metal-to-metal sealing occurs, the gate has tight dimensional tolerances. When the gate valve is closed, high-pressure fluids may apply loads over 100,000 pounds to a face of the gate. Under these loads, if the face of the gate is not smooth, flat, and parallel to the other face, the gate may be difficult to move, and it may not form a tight seal. High points on the faces can both cause leaks and increase the friction between the gate and seat rings. To prevent the gate from seizing or leaking, its faces are typically ground and lapped to remove these high points. A flat, smooth gate is also less likely to leak under the high pressures.

Generally, these tight tolerances are attained by manufacturing the gate in a particular sequence of steps. Initially, a first face of the gate is coated with a protective material. After coating, the deposited coating material typically is not flat or smooth, so the first face is then ground and lapped by using an opposing, second face, which is uncoated, as a reference, i.e., as the surface from which high points are measured during their removal. One way to do this is by supporting the second face with a flat surface and grinding the coating off the first face. The second face is used as a reference because, before the coating is applied, it is generally flat and, thus, serves as a reliable indicator of high points on the first face. Then, after the first face is coated and ground, the second face is coated, and the grinding process is repeated for this face. When grinding the second face, the ground surface on the first face, which was coated first, is used as a reference. After both sides are ground, they may be lapped to further refine their surfaces.

This sequence of both coating and grinding one side before coating and grinding the other side adds to the cost of the gate. The cost is increased when coating is performed by one vendor, and grinding and lapping are performed by a different vendor in a different location. Thus, to execute the sequence described above, the gate is shipped back and forth from the coating vendor to the grinding and lapping vendor two times, once for each face of the gate. The second trip incurs shipping costs and increases the time it takes to manufacture a gate, both of which tend to make gates more expensive.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some of the above-mentioned problems with conventional gate-manufacturing techniques may be mitigated by an exemplary gate-coating process described below. As explained, some embodiments of this process employ an uncoated reference structure so that both sides of the gate are coated before either side is ground or lapped. This process is explained by first describing the features of an embodiment of an uncoated gate with reference to FIG. 1, and then, describing this gate in sequential stages of an embodiment of a gate-coating process with reference to FIGS. 2-7. Finally, other embodiments of reference structures are described with reference to FIG. 8, and an embodiment of a gate valve is described with reference to FIG. 9. These figures and the following discussion will explain how to form and use reference structures on a gate, so that both faces of the gate may be coated before grinding or polishing.

Figure 1:
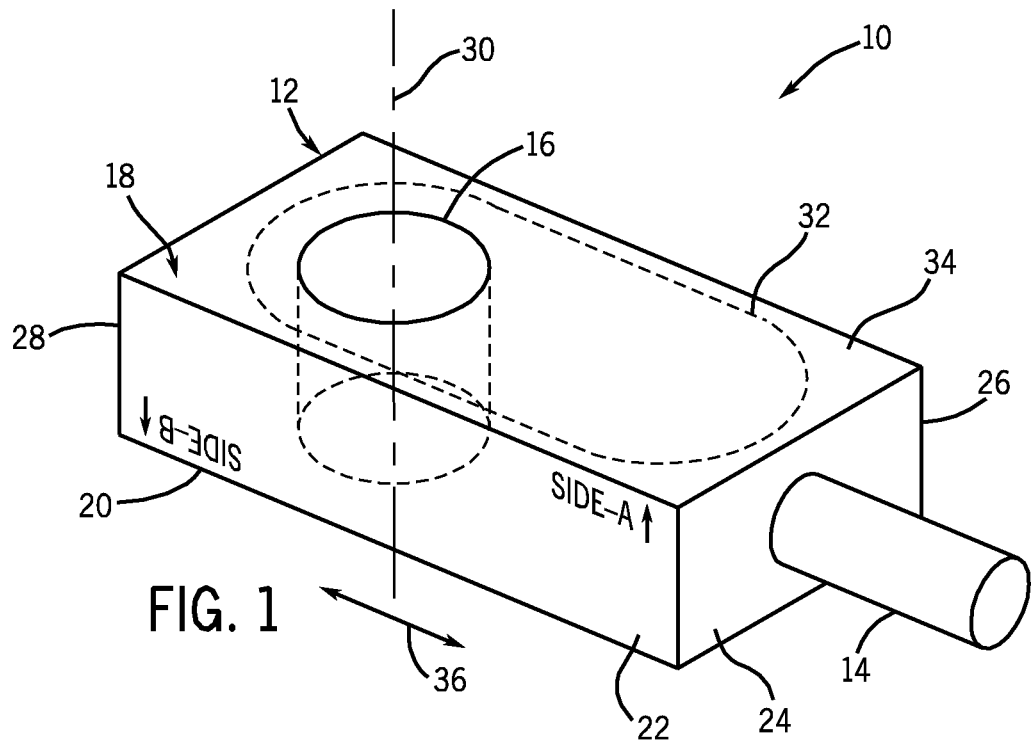
FIG. 1 depicts an embodiment of a gate.

FIG. 1 illustrates an exemplary embodiment of a gate 10, which includes a body 12 and a neck 14. In this embodiment, the body 12 has a generally rectangular-parallelepiped shape, and the neck 14 had a generally right-circular-cylinder shape. In other embodiments, the body 12 and neck 14 may have shapes that are different from those shown in FIG. 1. Both the body 12 and the neck 14 may be made of steel or other appropriate materials. As described below, the surface of opposing faces of the body 12 may be generally parallel and generally smooth to facilitate sealing and minimize friction.

In this embodiment, the body 12 includes a flow bore 16, opposing first and second faces 18 and 20, and edges 22, 24, 26, and 28. The illustrated flow bore 16 defines a generally right-circular-cylinder shaped volume that is concentric about a flow bore axis 30, which is itself generally perpendicular to the opposing faces 18 and 20. As illustrated, the flow bore 16 extends entirely through the gate 10, from the face 18 to the face 20. The edges 22, 24, 26, and 28 are generally planar surfaces that are either generally parallel or perpendicular to one another. The edges 22, 24, 26, and 28 can have different shapes, such as curves, planes with groves, etc. The faces 18 and 20 are generally planar surfaces that are generally parallel to one another and perpendicular to the flow bore 16. In some embodiments, the corners, where the edges 22, 24, 26, and 28 meet each other and the faces 18 and 20, may be chamfered.

Each face 18 and 20, in the illustrated embodiment, includes a seat-contact area 32 and an outer area 34. As used herein, the term "seat-contact area" refers to the area of the face 18 or 20 that contacts a seat ring as the gate 10 is moved from an open (e.g., unsealed) position to a closed (e.g., sealed) position. In this embodiment, the seat-contact area 32 has a generally oblong shape, e.g., obround. The rest of each face 18 and 20, e.g., the area outside the seat-contact area 32, may be referred to as the outer area 34. This is the area that does not contact a seat ring when the gate 10 is in the closed position, the open position, or moving there between.

The illustrated edge 24 is generally perpendicular to the neck 14, which may be integrally formed with the body 12 or may be coupled to the body 12, for example by a threaded coupling or interlocking structures. As explained below, the neck 14 may be configured to link the body 12 to other components that drive the gate 10 back and forth along a generally linear direction of movement 36, which is generally parallel to the faces 18 and 20 and generally perpendicular to the flow bore axis 30.

As mentioned, the gate 10, as shown in FIG. 1, is uncoated. Below, an exemplary embodiment of a gate-coating process is described by referring to FIGS. 2-7, which illustrate the gate 10 in sequential stages of the process.

Figure 2:
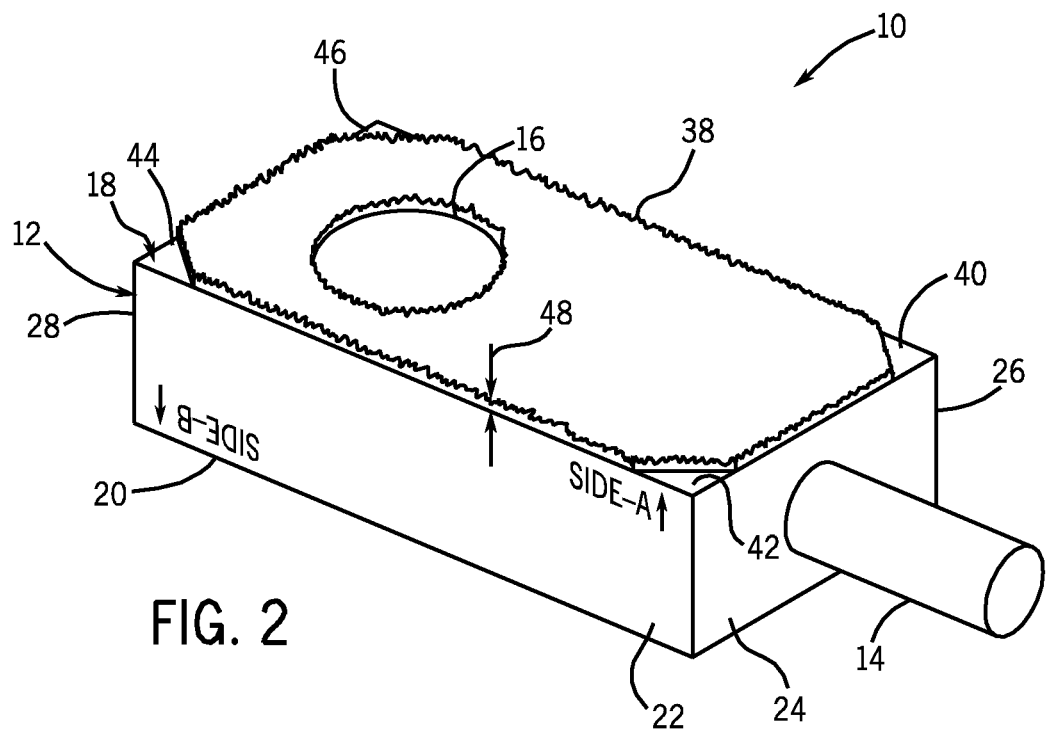
FIG. 2 depicts the gate of FIG. 1 after coating one face.

FIG. 2 illustrates the gate 10 after a coating 38 has been applied to the face 18. In this embodiment, the coating 38 is not applied to the entire face 18; it is patterned to form reference structures 40, 42, 44, and 46. This type of reference structure, e.g., uncoated surfaces of the face 18, may be referred to as a reference surface. Other types of reference structures are described below when discussing FIG. 8. The illustrated pattern is formed by masking reference surfaces 40, 42, 44, and 46 before applying the coating 38. In other embodiments, the pattern may be formed without masking the reference surfaces 40, 42, 44, and 46 by not directing a coating applicator, such as a spray nozzle, toward the reference surfaces 40, 42, 44, and 46. In some embodiments, the coating 38 may be applied to the entire face 18 and then removed from the reference surfaces 40, 42, 44, and 46 to form the illustrated pattern. At the illustrated stage of the process, the coating 38 is applied to only one of the two faces 18 and 20, but in other embodiments, the coating 38 may be applied to both of these faces 18 and 20 at generally the same time.

The illustrated coating 38 may be characterized by an average thickness 48, a global variation in thickness, and a surface roughness. As used herein, the term "global variation in thickness" refers to the difference between the thickest portion of the coating 38 and the thinnest portion of the coating 38, and the term "surface roughness" refers to RMS surface finish. To illustrate the global variations in thickness and the surface roughness, the average thickness 48 is exaggerated in FIG. 2. Generally, as deposited, the surface roughness is greater than or equal to 100 RMS, and the global variation in thickness is greater than or equal to 0.004" (corresponding to a range of thickness of 0.006" to 0.010" for carbide). The average thickness, in the present embodiment, is approximately equal to 0.008" for carbide or 0.001" for chrome. A coating 38 with these qualities may be referred to as an un-planarized coating.

The coating 38 may be applied with a variety of techniques. In one embodiment, the coating 38 is a carbide coating applied as a thermal spray. For example, the coating 38 may be applied with a high-velocity, oxygen-fuel, thermal-spray process (HVOF), in which oxygen and a fuel gas are combusted through a nozzle to drive melted coating particles against the face 18 at a high velocity. Upon impact, these particles freeze on the face 18. The HVOF spray process applies a strip of coating 38 to the face 18 as the nozzle is moved across the face 18. The width of the strip normally is relatively small in comparison with the area of the face 18. In some embodiments, the nozzle may raster across the entire face 18 to apply a single layer, and the coating 38 is applied in multiple passes of the nozzle, with each pass applying one of several layers, for example, 8 or 9 layers. In other embodiments, the coating 38 may be applied with electro or electroless deposition, chemical vapor deposition, or physical vapor deposition.

The illustrated reference surfaces 40, 42, 44, and 46 are at the corners of the face 18, outside the contact area 32 and in the outer area 34. In this embodiment, each of these reference surfaces 40, 42, 44, and 46 are generally right, isosceles triangles, but in other embodiments, they may have a different shape or may be different in number or location. The illustrated reference surfaces 40, 42, 44, and 46 do not overlap the contact area 32, but in other embodiments, there may be some overlap. In this embodiment, the reference surfaces 40, 42, 44, and 46 are non-contiguous, but in other embodiments two or more of the reference surfaces 40, 42, 44, and 46 may be contiguous, e.g., there may be a single, contiguous reference surface around the perimeter of the contact area 32.

Figure 3:
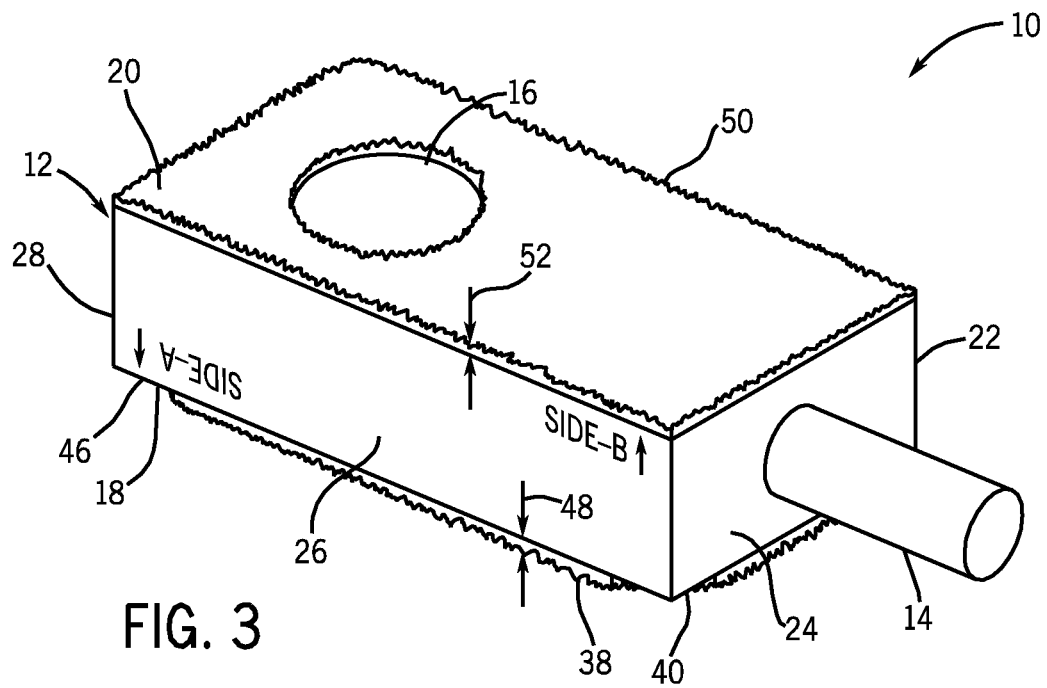
FIG. 3 depicts the gate of FIG. 2 after coating the other face.

After coating the first face 18, the second face 20 may be coated, as illustrated by FIG. 3. To clearly depict the face 20, the gate 10 is shown rotated 180 degrees, with the side that was formerly on the top now on the bottom, as indicated by a comparison of the labels "SIDE-A" and "SIDE-B" in FIGS. 2 and 3. In this embodiment, a coating 50 is applied to the face 20. The coating 50 may be the same material as the coating 38, or they may be different materials. In this embodiment, the face 20 does not have a reference surface, but in other embodiments, both faces 18 and 20 may include reference surfaces. Like the coating 38, the coating 50 may be characterized by an average thickness 52, a global variation in thickness, and a surface roughness that are generally equal or similar to those of the coating 38. It should also be noted that, in this embodiment, the coating 50 is applied before the coating 38 on the other face 18 has been ground or otherwise planarized.

Figure 4:
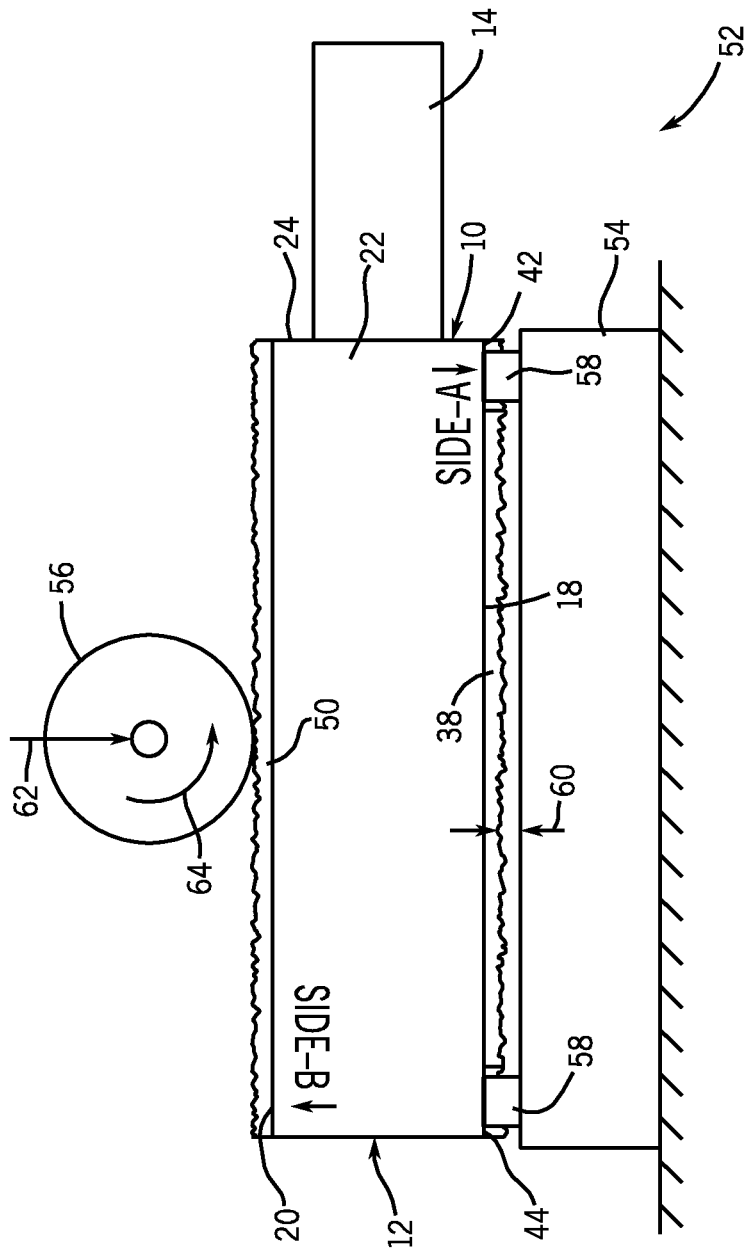
FIG. 4 depicts the gate of FIG. 3 with one face being planarized on a grinding table.

After both faces 18 and 20 are coated, the coating 50 on the face 20 may be planarized with respect to the reference surfaces 40, 42, 44, and 46, as illustrated by FIG. 4. In this embodiment, the gate 10 is placed in a grinder 52, between a pressure block 54 and a side of a grinding wheel 56. The illustrated pressure block 54 includes four contact members 58 that each align with, and contact, one of the reference surfaces 40, 42, 44, and 46. The rest of the pressure block 54 is spaced below the coating 38, as illustrated by the gap 60. The coating 50 is pressed against a generally flat surface of the grinding wheel 56.

While grinding, a downward force, illustrated by arrows 62, is applied to the grinding wheel 56, and the pressure block 54 reacts against this load by applying a force to the reference surfaces 40, 42, 44, and 46 through the contact members 58. As a result of these counteracting forces, the coating 50 is biased against the grinding wheel 56. At generally the same time, the grinding wheel 56 rotates, as illustrated by arrow 64, and moves back and forth across the face 20. As the grinding wheel 56 rotates, the high points of the coating 50 (as measured from the reference surfaces 40, 42, 44, and 46) are abraded away, thereby planarizing the coating 50.

As used herein, the term "planarize" refers to processes that tend to make the surface of the coatings 38 and 50 more planar, e.g., lower their global variation in thickness and/or reduce their surface roughness. Other examples of planarizing include lapping and polishing. Planarizing may be largely mechanical in nature (e.g., grinding), a combination of chemical and mechanical effects (e.g., polishing), or largely chemical in nature (e.g., a chemical etch).

Advantageously, both faces 18 and 20 may be coated before either side is ground. Because the gate 10 is oriented with respect to the grinding wheel 56 by contact between the reference surfaces 40, 42, 44, and 46 and the contact members 58, the face 18 serves as a reference when grinding coating 50, even though the face 18 is partly covered by the coating 38. Thus, uneven portions of the coating 38 do not interfere with grinding the coating 50 on the opposing face 20. As a result, the gate 10 may be coated in one facility and ground in another facility without shipping the gate 10 back and forth between coating each face 18 and 20.

Figure 5:
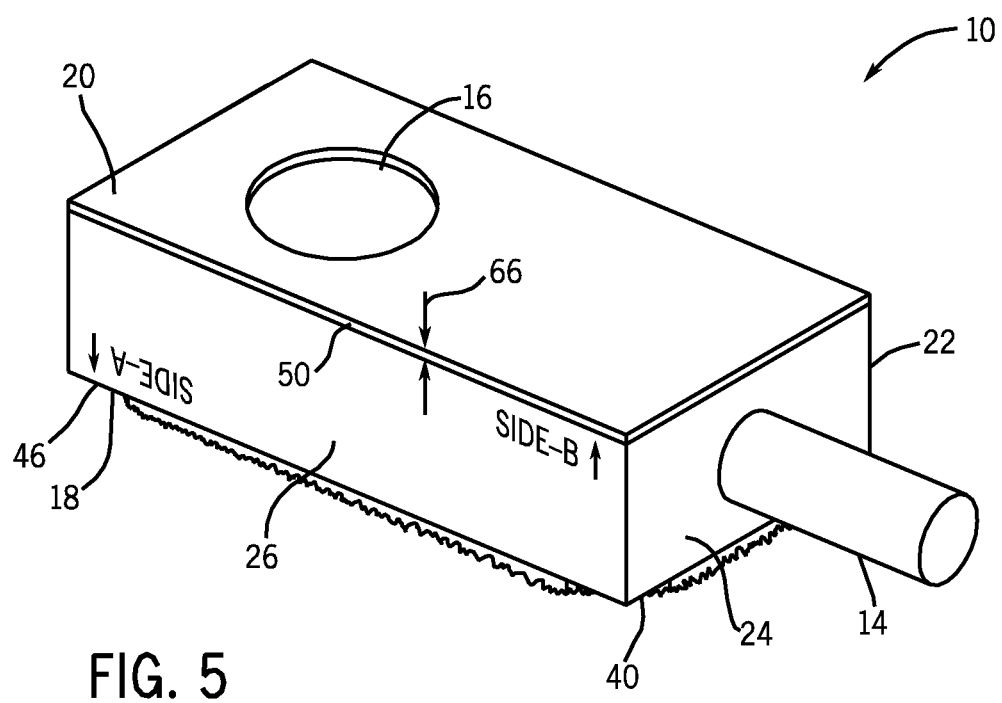
FIG. 5 depicts the gate of FIG. 4 after it has been ground on one face.

FIG. 5 illustrates the gate 10 after the coating 50 has been ground. As illustrated, coating 50 has a generally smooth and planar surface, which is generally parallel to a plane defined by three or more of the reference surfaces 40, 42, 44, and 46. The coating 50 may be characterized by a post-grinding average thickness 66 of less than 0.005" or 0.003", a post-global thickness variation that is less than 0.002".

Figure 6:
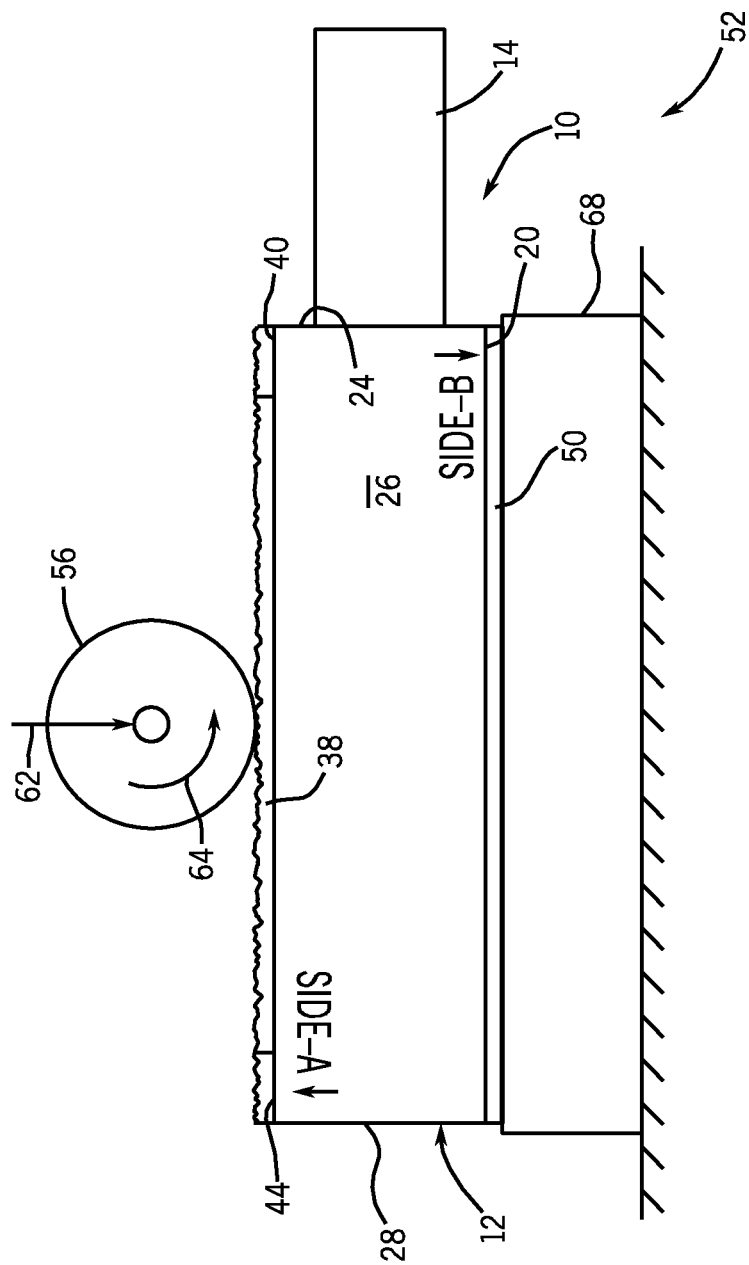
FIG. 6 depicts the gate of FIG. 5 with the other face being planarized on the grinding table.

After the coating 50 on face 20 is ground, the other coating 38 on face 18 may be ground, using the generally planar surface of the coating 50 as a reference. FIG. 6 illustrates the coating 38 being ground. At this stage of the exemplary gate-coating process, the grinding wheel 56 is pressed against the gate 10, which is supported by a generally flat pressure block 68. As a result, the flat surface of the coating 50 serves as a reference while grinding the high points from the coating 38. As with the other coating 50, after grinding, the coating 38 maybe lapped and/or polished to reduce surface roughness.

Figure 7:
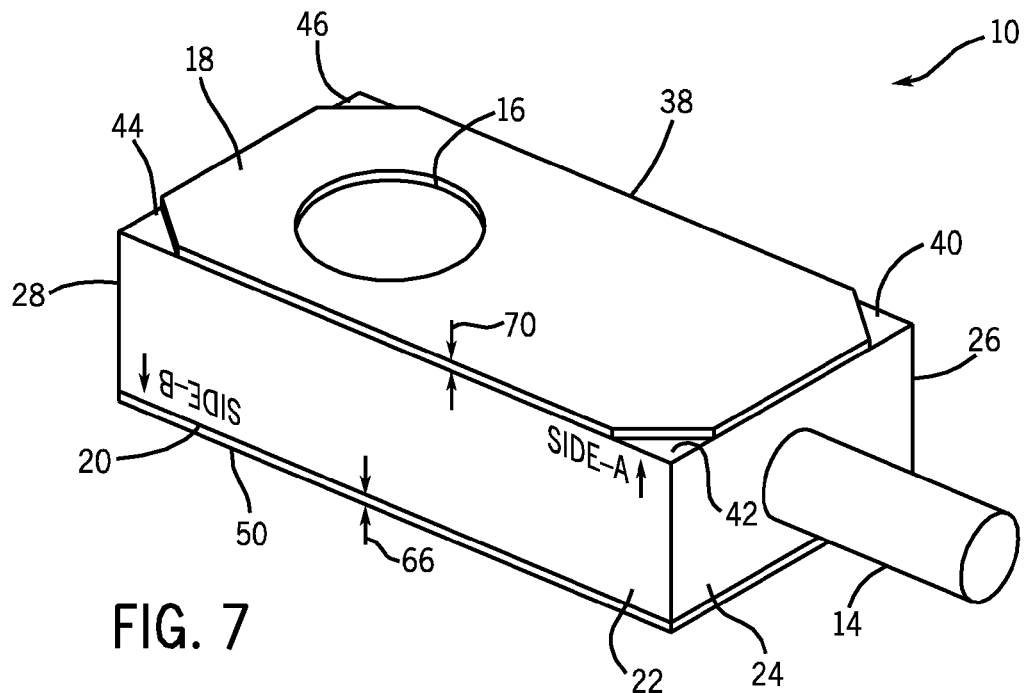
FIG. 7 depicts the gate of FIG. 6 after both faces have been ground.

FIG. 7 illustrates the gate 10 after both coatings 38 and 50 have been ground. After grinding, the coating 38 may be characterized by an average thickness 70, a global variation in thickness, and a surface roughness that are similar to the values described above for the coating 50.

After grinding, in the present embodiment, the faces 18 and 20 are lapped. During this step, the faces 18 and 20 are pressed against a lapping table, and a small amount of coating 38 and 50 is removed, e.g., 0.0002" to 0.0005". After lapping, the surface roughness may be less than 8 RMS, 4 RMS, or as low as 1 RMS for gas sealing. The surfaces of the coating 38 and 50 may be generally parallel to each other (e.g., less than 0.0001"), and generally flat (e.g., less than 0.000030").

Now that it is has coated and planarized faces 18 and 20, the illustrated gate 10 may be installed within a gate valve, such as the gate valve described below with reference to FIG. 9. However, prior to describing this gate valve, another embodiment of a gate is described with reference to FIG. 8.

Figure 8:
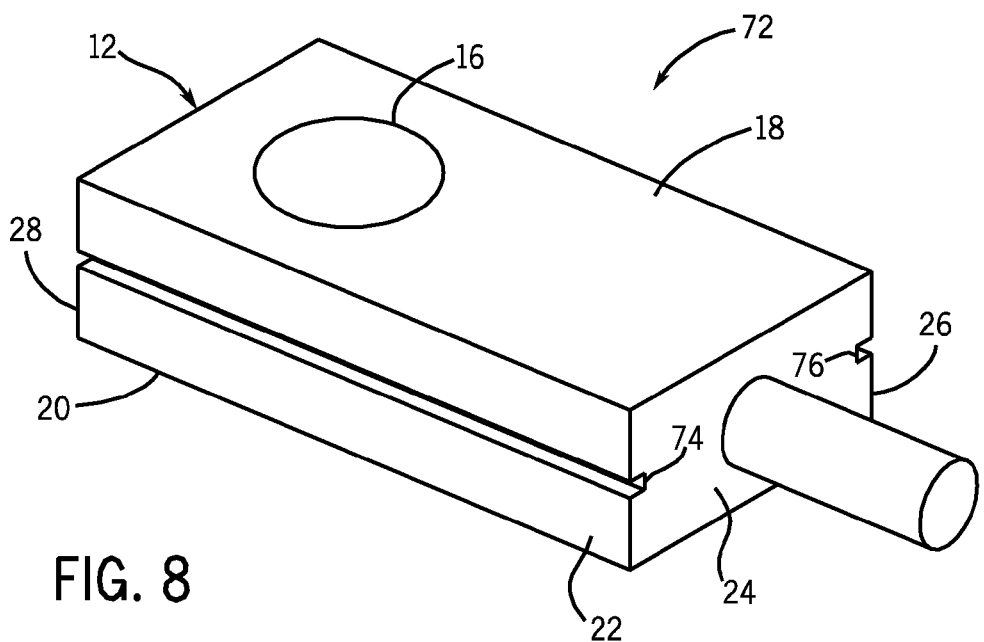
FIG. 8 depicts another embodiment of a gate.

FIG. 8 illustrates another example of a gate 72 that includes reference structures 74 and 76 cut into its edges 22 and 26, respectively. The illustrated reference structures are generally rectangular-parallelepiped channels that extend along the entire length of each edge 22 and 26.

In other embodiments, the reference structures 74 and 76 may be disposed on the other edges 24 and/or 28 and may have different shapes. For example, the reference structures 74 and 76 may be generally right, circular cylindrical holes drilled into the sides 22 and 26 or 24 and 28, or they may be tabs or other structures extending outward from the sides 22, 24, 26, and/or 28. The reference structures that extend out from the edges 22, 24, 26, or 28, such as taps, ridges or ledges, are referred to as protruding reference structures, and the reference structures that extend into the edges 22, 24, 26, or 28, such as the illustrated reference structures 24 and 26 or holes, are referred to as recessed reference structures.

The reference structures 74 and 76 may not necessarily be present on a completed gate 72. For example, in some embodiments with a recessed reference structure, such as the reference structures 74 and 76, the reference structure may be filled and after the gate 72 is ground and lapped. Similarly, in some embodiments with a protruding reference structure, the reference structure maybe removed, for example by machining, after the gate 72 is ground and lapped.

To coat the gate 72, a coating may be applied to substantially all of each of the faces 18 and 22, in an arrangement similar to the coating shown in the FIG. 3. In some embodiments, gate 72 may not include the reference surfaces 40, 42, 44, or 46 shown in FIG. 2.

To planarize the coating on faces 18 or 20 of the gate 72, the reference structures 74 and 76 may be used as a reference for one or more of the faces 18 and 20. For example, after coating both of the faces 18 and 20, the gate 72 may be placed under a grinding wheel, and complementary members may be inserted into the reference structures 74 and 76. The complementary members may apply an upward force to the reference structures 74 and 76 as they support the gate 72, and the grinding wheel may press downward, against the face 18 or 20. The reference structures 74 and 76 may provide a reference to remove high points from the coating pressed against the grinding wheel. In some embodiments, the reference structures 74 and 76 may support the gate 72 when grinding both of the faces 18 and 20 or when grinding only one of the faces 18 or 20.

Figure 9:
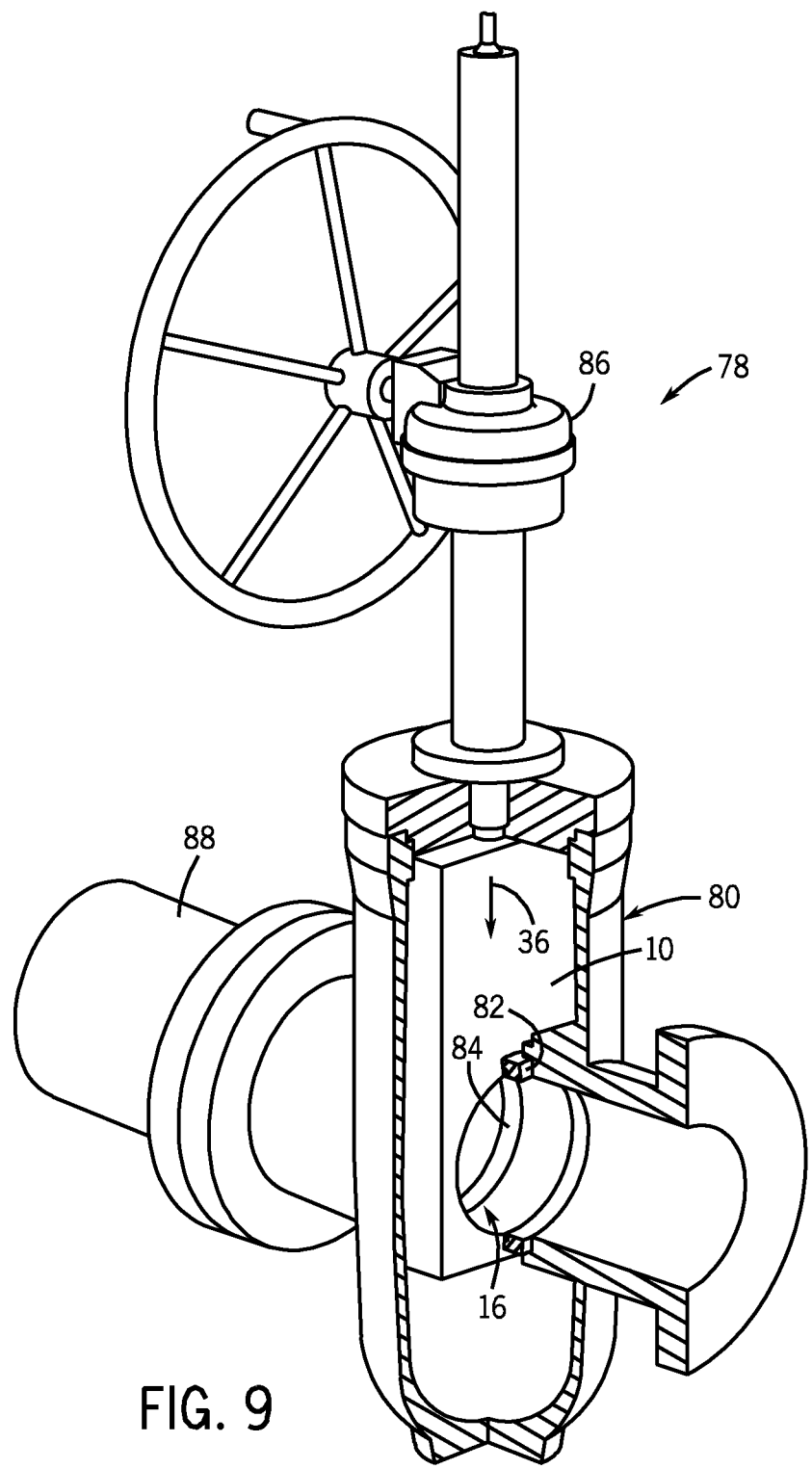
FIG. 9 depicts an embodiment of a gate valve that includes the gates of FIG. 7 or 8.

FIG. 9 illustrates a gate valve 78 that includes the gate 10 illustrated by FIG. 2 or the gate 72 illustrated by FIG. 8. The illustrated gate valve 78 includes a housing 80, seat rings 82 and 84, and a drive 86. The illustrated gate 10 is slideably disposed between the seat rings 82 and 84. When the gate 10 is in an open position, the flow bore 16 generally aligns with the rings 82 and 84. To close the valve 78, the drive 86 is energized, and the gate 10 moves along a generally linear path, illustrated by arrow 36, to a closed position, in which the flow bore 16 does not overlap rings 82 and 84.

The housing 80 couples to a pipeline 88, which may carry a high-pressure fluid, such as a hydrocarbon at pressures over 30,000 psi. In some embodiments, an inner pipe may be disposed within the pipe 88, and the inner pipe may extend through the flow bore 16. In some of these embodiments, when the gate valve 78 is closed, it shears the inner pipe and closes the flow there through.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus, comprising:
   a body of a gate configured to seal a gate valve, wherein the body comprises:
      a first face having a first coating covering substantially all of the first face; and
      a second face opposite the first face and having a second coating covering substantially all of the second face;
      a flow bore that extends from the first face, through the body of the gate, to the second face; and
      a reference structure excluding both the first coating and the second coating, wherein the reference structure is configured to define a plane to enable a planarization process after the first and second coatings are disposed on the first and second faces of the body.

2. The apparatus of claim 1, wherein the body has a generally rectangular-parallelepiped shape, and the flow bore defines a generally cylindrical volume with sidewalls that are generally perpendicular to the first face.

3. The apparatus of claim 1, wherein both the first coating and the second coating comprise carbide.

4. The apparatus of claim 1, wherein the first coating on the first face and the second coating on the second face are not planarized.

5. The apparatus of claim 1, wherein the reference structure comprises a reference surface on the first face configured to stabilize the body of the gate during the planarization process, and wherein the reference surface is a portion of the first face that does not have the first coating disposed thereon.

6. The apparatus of claim 1, wherein the reference structure comprises three or more noncontiguous reference surfaces on the first face configured to stabilize the body of the gate during the planarization process.

7. The apparatus of claim 1, wherein the reference structure comprises one or more reference surfaces that collectively encompass four corners of the first face configured to stabilize the body of the gate during the planarization process.

8. The apparatus of claim 1, wherein the second coating entirely covers the second face.

9. The apparatus of claim 1, wherein the reference structure is disposed on an edge of the body of the gate, the reference structure is configured to stabilize the body of the gate during the planarization process, and the reference structure comprises a recessed portion or a protruding portion.

10. The apparatus of claim 1, comprising:
    a housing that at least partially envelops the body of the gate;
    a neck that extends from the body of the gate;
    a drive that moveably couples both the neck and the body of the gate to the housing; and
    a first seat ring disposed adjacent the first face and coupled to the housing; and
    a second seat ring disposed adjacent the second face and coupled to the housing.

11. A method, comprising:
    applying a first coating to substantially all of a first face of a gate;
    applying a second coating to substantially all of a second face of the gate;
    after applying the first coating to substantially all of the first face of the gate and applying the second coating to substantially all of the second face of the gate, planarizing the second face of the gate by applying a force to a first reference structure on the gate, wherein the first reference structure is not coated, and the first reference structure is not disposed on the second face of the gate.

12. The method of claim 11, wherein applying the first coating to the first face comprises impinging a high-velocity, oxygen-fuel thermal spray on the first face.

13. The method of claim 11, wherein applying the first coating to the first face comprises masking a plurality of reference surfaces on the first face, and wherein the reference surfaces are the first reference structure.

14. The method of claim 13, wherein the reference surfaces are outside of a seat contact area on the first face.

15. The method of claim 13, wherein planarizing the second face comprises planarizing the second face by applying a force to the reference surfaces and not to a coated portion of the first face.

16. An apparatus, comprising:
    a body of a gate valve, comprising:
       first and second faces that are opposing and general parallel to one another;
       a flow bore that extends through the body from the first face to the second face;
       a planarization reference structure disposed on the body, wherein the planarization reference structure is uncoated and defines a planarization reference plane;
       a first coating disposed over the first face, wherein the first coating has a first planarized surface extending in a first plane;
       a second coating disposed over the second face, wherein the second coating has a second planarized surface extending in a second plane, and the first and second planes are both correlated to the planarization reference plane;
       wherein the first coating covers substantially all of the first face, and the second coating covers substantially all of the second face.

17. The apparatus of claim 16, wherein the first coating covers all of the first face except for at least two uncoated surfaces along an outermost perimeter of the first face, wherein the at least two uncoated surfaces are completely separated from one another by the first coating on the first face.

18. An apparatus, comprising:
    a body of a gate valve, comprising:
       first and second faces that are opposing and general parallel to one another;
       a flow bore that extends through the body from the first face to the second face;
       a planarization reference structure disposed on the body, wherein the planarization reference structure is uncoated and defines a planarization reference plane;
       a first coating disposed over the first face, wherein the first coating has a first planarized surface extending in a first plane;
       a second coating disposed over the second face, wherein the second coating has a second planarized surface extending in a second plane, and the first and second planes are both correlated to the planarization reference plane;

wherein the body comprises first and second lateral sides that are opposing to one another and generally transverse to the first and second faces, the planarization reference structure comprises first and second structures disposed on the first and second lateral sides of the body between the first and second faces, and the first and second structures each comprise a recess or protrusion relative to the respective first or second lateral side.

\* \* \* \* \*